July 18, 1944.  R. J. NITSCH  2,353,898
FILTER AND HEATER UNIT HOLDER PARTICULARLY FOR AERIAL CAMERAS
Filed Oct. 9, 1942  4 Sheets-Sheet 1
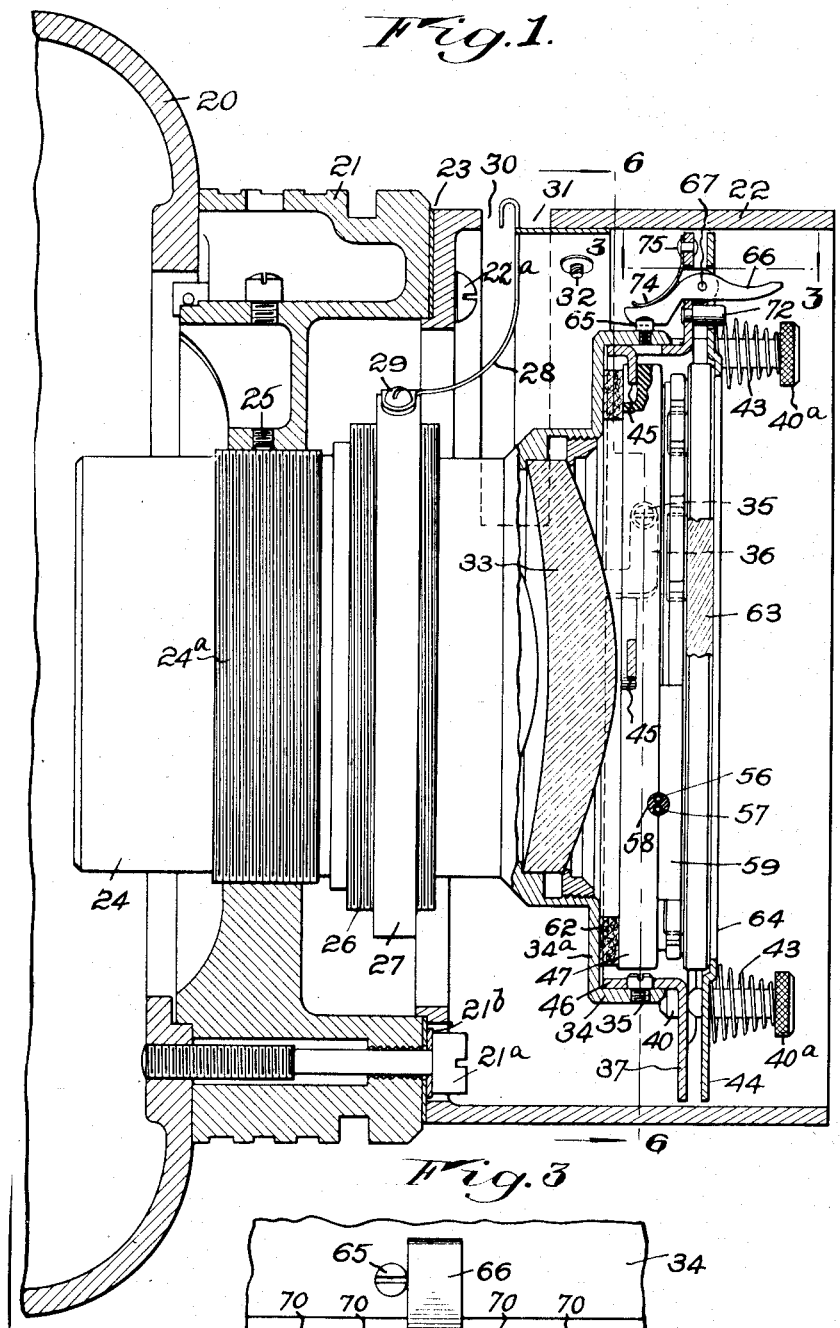
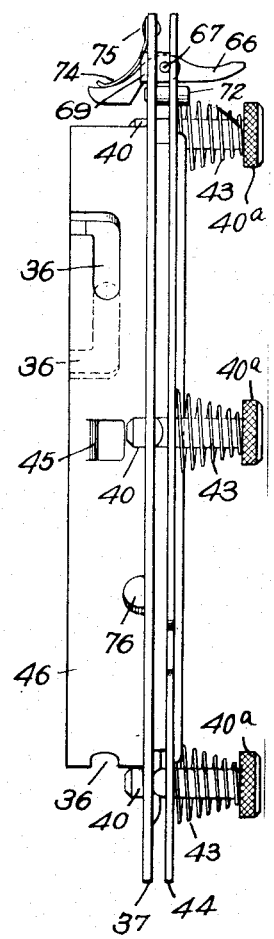
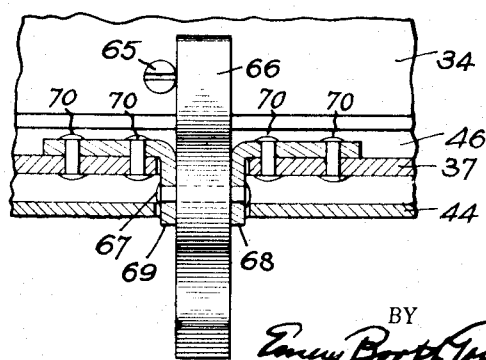
INVENTOR.
Reynold J. Nitsch
BY
his Attorneys

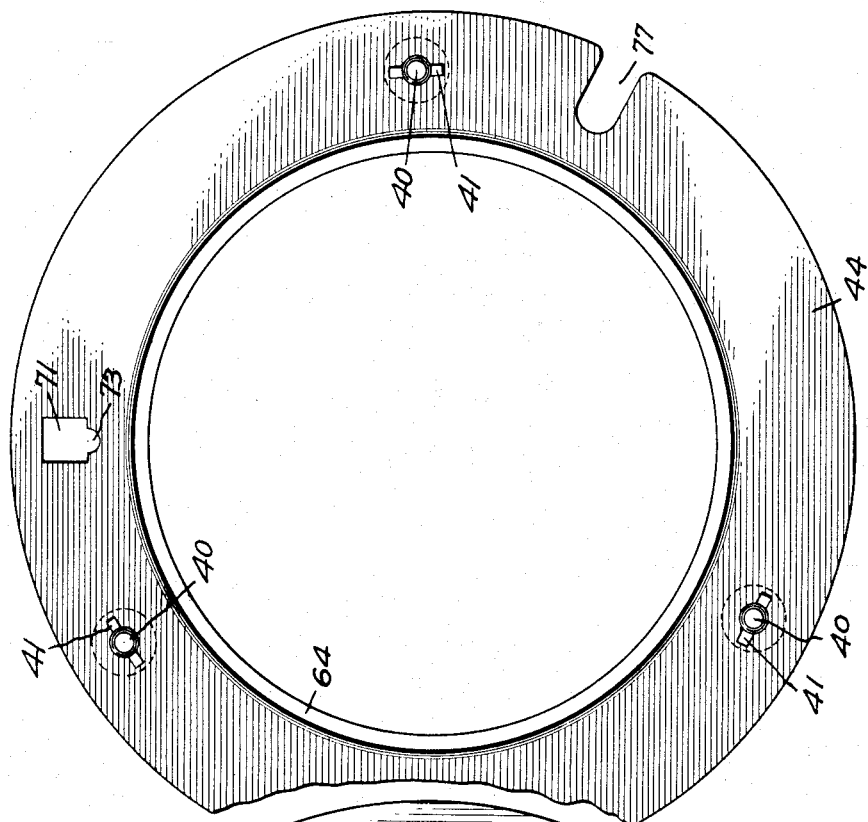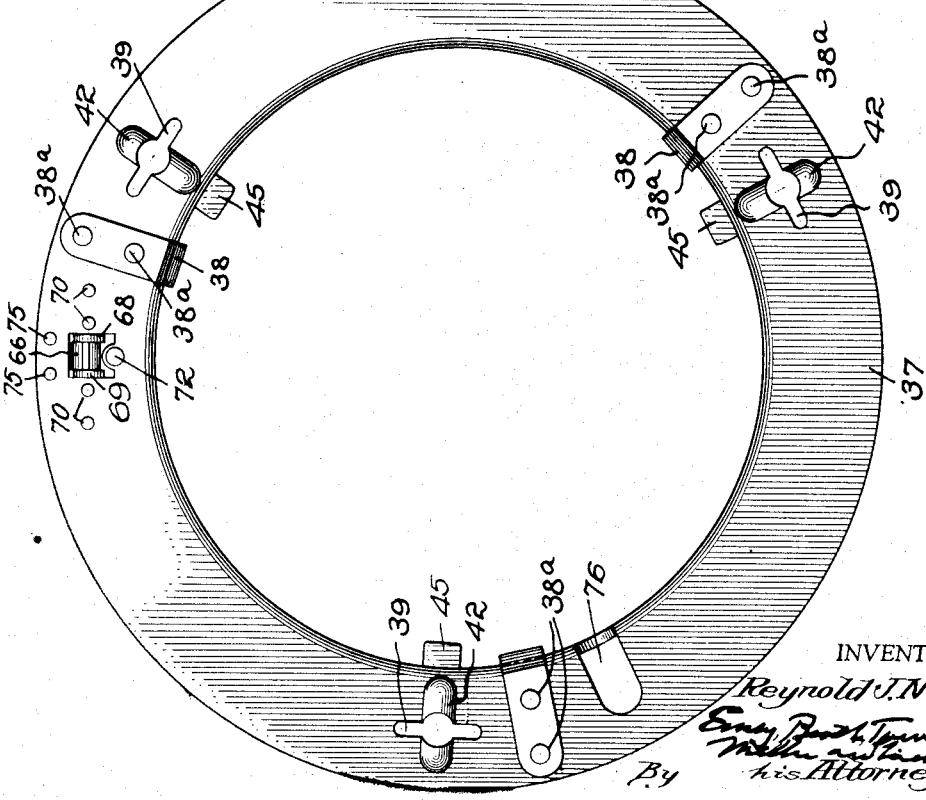

July 18, 1944.   R. J. NITSCH   2,353,898
FILTER AND HEATER UNIT HOLDER PARTICULARLY FOR AERIAL CAMERAS
Filed Oct. 9, 1942   4 Sheets-Sheet 3
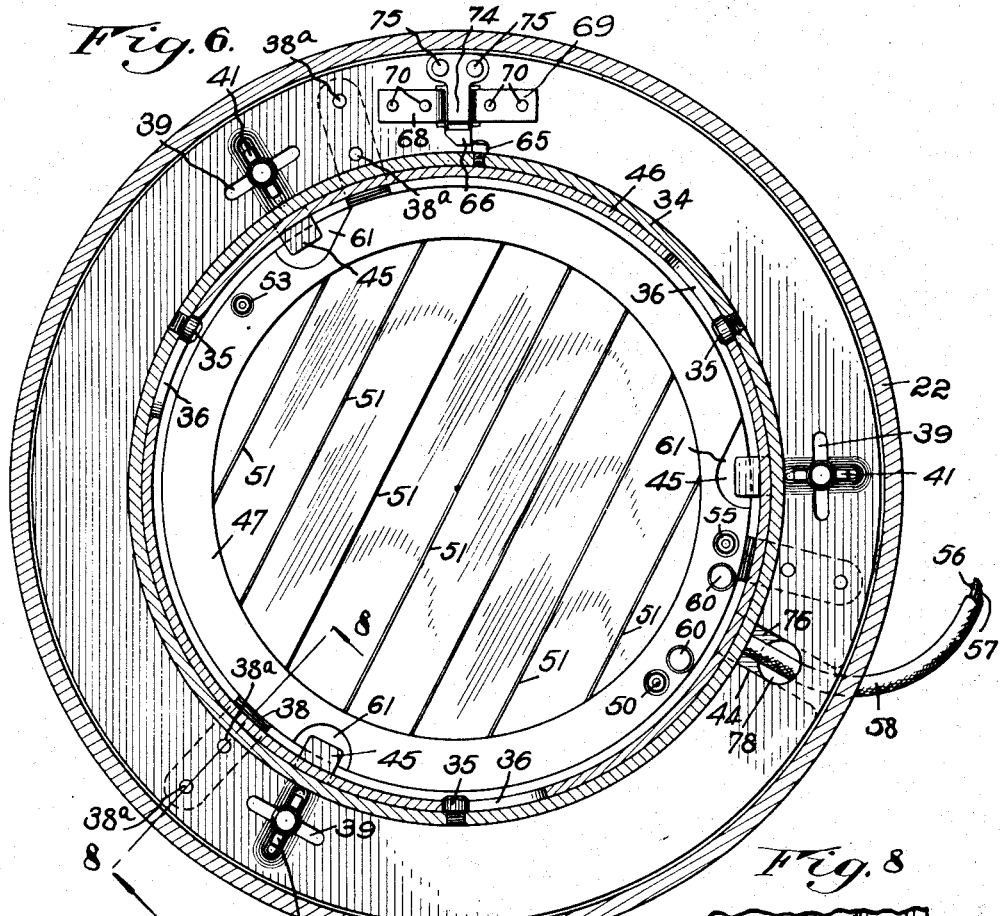
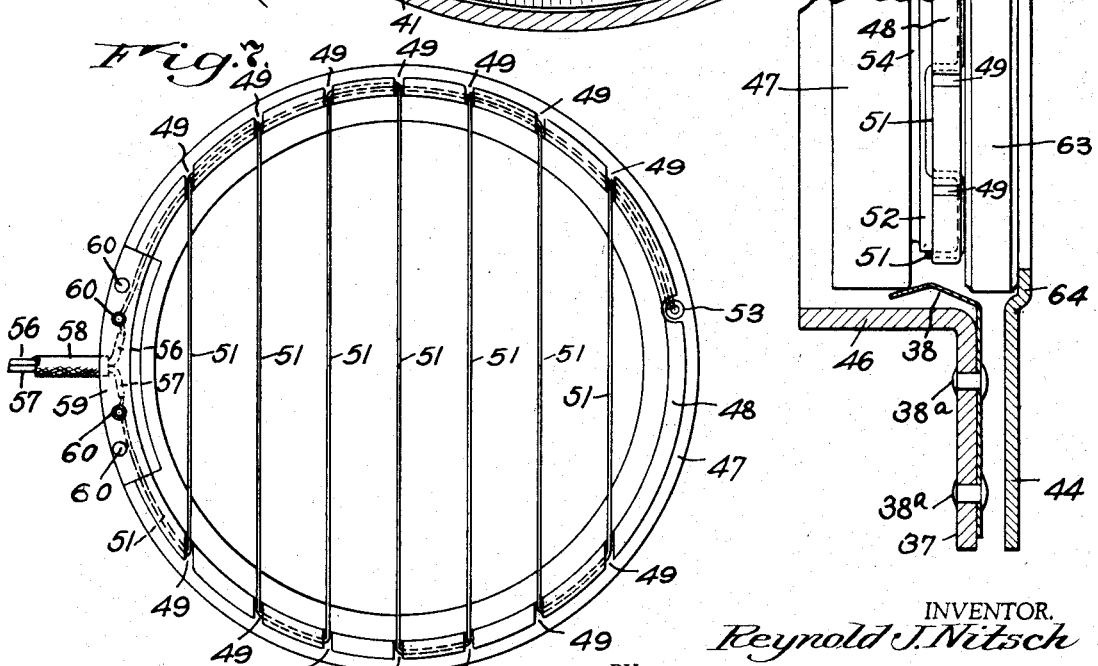
INVENTOR.
Reynold J. Nitsch
BY
his Attorneys July 18, 1944.  R. J. NITSCH  2,353,898
FILTER AND HEATER UNIT HOLDER PARTICULARLY FOR AERIAL CAMERAS
Filed Oct. 9, 1942   4 Sheets-Sheet 4
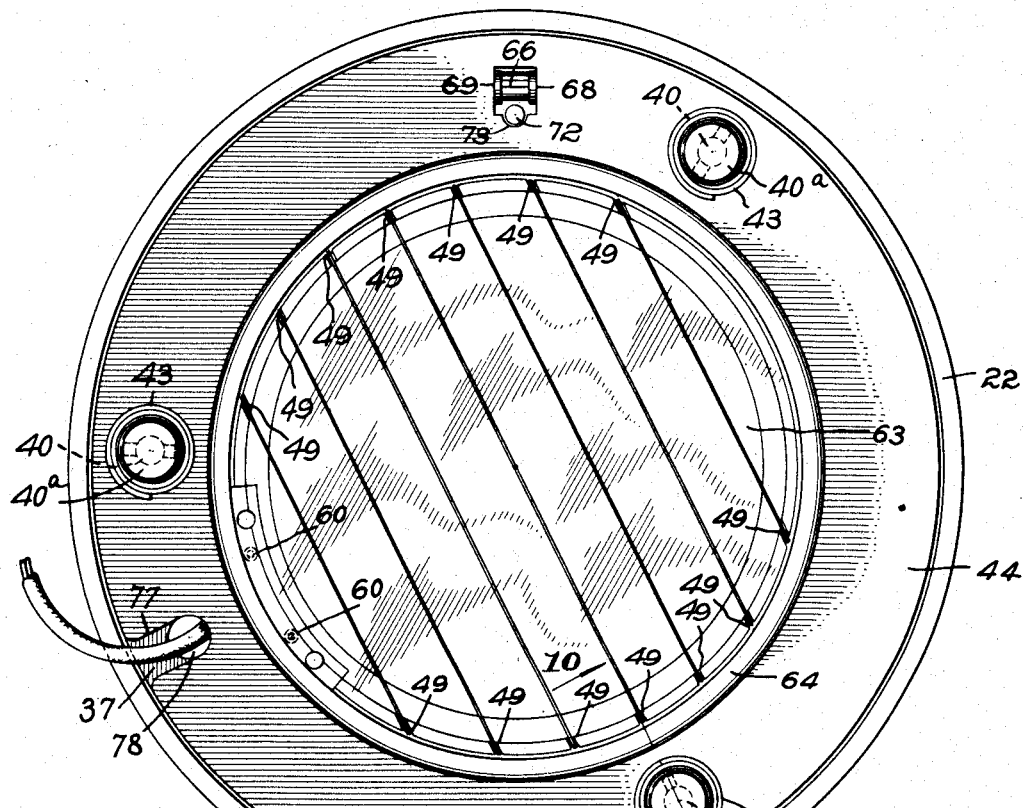
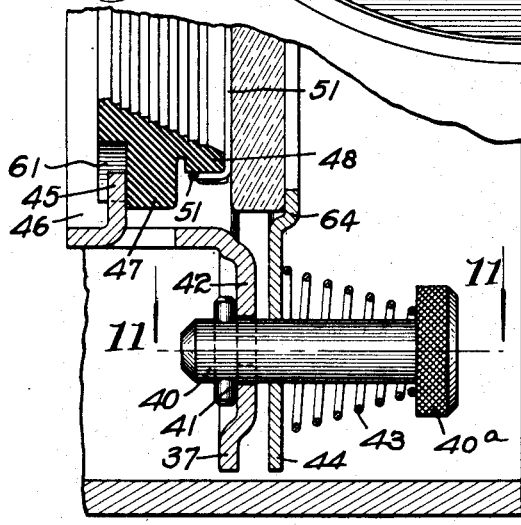
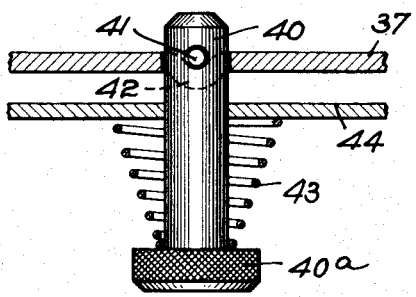
INVENTOR.
Reynold J. Nitsch
BY
his Attorneys Patented July 18, 1944

2,353,898

UNITED STATES PATENT OFFICE 2,353,898

FILTER AND HEATER UNIT HOLDER, PARTICULARLY FOR AERIAL CAMERAS

Reynold J. Nitsch, Rochester, N. Y., assignor to The Folmer Graflex Corporation, Rochester, N. Y., a corporation of Delaware Application October 9, 1942, Serial No. 461,395

30 Claims. (Cl. 95—81.5)

This invention relates to new and improved filter and heater unit mounts or holders particularly adapted to aerial photographic cameras.

In order that the principle of the invention may be readily understood, I have disclosed a single embodiment thereof in the accompanying drawings, wherein—

Fig. 1 is a partial cross section through the nose of an aerial camera, showing the position of the lens barrel and having a filter mount attached thereto, in accordance with my invention;

Fig. 2 is a left side elevation of the filter mount removed from the lens barrel;

Fig. 3 is a fragmentary top plan view partially in section of the filter mount and lens barrel, and showing the locking means;

Fig. 4 shows in elevation the rear element of the filter mount and the position of the several parts that make up this unit;

Fig. 5 is a view in elevation of the front element of the filter mount and shows the clamping means provided therefor;

Fig. 6 is a vertical section through Fig. 1 on the line 6—6 thereof showing the position of the heater unit in the mount and the supporting means therefor;

Fig. 7 is a vertical elevation in detail of the heating unit viewed from the front;

Fig. 8 is a cross section through Fig. 6 on the line 8—8 thereof, showing the means for holding the heating unit and the rear element of the filter holder;

Fig. 9 is a front elevation of the filter mount with the filter and heating unit in place;

Fig. 10 is a cross section through Fig. 9 on the line 10—10 thereof, showing the mounting of the heating unit and the filter and the means providing a resilient clamping action between the two units that make up the filter mount; and Fig. 11 is a horizontal cross section through Fig. 10 on the line 11—11 thereof, showing the construction of one of the clamping units.

When aerial cameras are used for high altitude photography, it has become a common practice to provide heating units for the objective lens and filter to prevent frosting of these elements when the airplane makes a rapid descent. My invention is particularly directed to mounting means for securely holding both the heater unit and the filter in place on camera lens mounts of aerial cameras, though not confined thereto. The mounting means of my invention is of a construction to prevent air blasts striking the lens mount when the filter mount is in place.

One of the objects of the invention is to provide a filter mount that is readily attached to or detached from the objective lens supporting means. Among other objects of the invention are to provide a filter mount that is self-adjusting for filters of various thicknesses; to provide a filter mount that will readily accept a heating unit and will securely hold the same in place; to provide a filter mount so constructed that filters can be removed or replaced without disturbing the heating unit; to provide a filter mount having a baffle to prevent air blasts from reaching the objective lens mount; to provide a filter mount having sealing means between the lens mount and the heater unit; to provide a filter mount having means to hold the filter and heating unit securely in place and without causing undue strain to the filter glass because of rapid changes in temperature; and to provide a filter mount having means securely to lock the mount to the objective lens housing, the said lock being readily releasable for removing the filter mount.

Referring first to Fig. 1, a portion of the body of an aerial photographic camera is indicated at 20, and thereto is attached a lens support mounting ring 21 by means of a suitable number of through screws 21a provided with lock washers 21b. A lens shade 22 is attached to the mounting ring 21 by means of a suitable number of screws 22a. Between the said mounting ring 21 and the lens shade 22 is a separator or shim 23 and threaded into an opening provided therefor in the mounting ring 21 is a lens barrel 24 having threads 24a. The lens barrel 24 is locked in place by a suitable number of lock screws 25 after having been correctly positioned. The lens barrel 24 is also provided with a second threaded portion 26, to which is fitted in the usual manner a diaphragm control ring 27. In order to operate the diaphragm control ring 27 from the outside of the lens shade 22, there is provided an arm 28 extending outwardly as indicated and secured to the diaphragm control ring 27 by screws, one of which is indicated at 29 in Fig. 1. The said arm 28 is free to be moved in a rotary direction in a slot 30 provided therefor in the lens shade 22. In order to hold the diaphragm control ring 27 in any selected position, there is provided a curved lock plate 31 of suitable length and attached to the lens shade 22 by screws, one of which is indicated at 32. The said lock plate 31 is provided with a series of notches (not shown) located in proper spaced relation with respect to the several diaphragm openings. The lens barrel 24 is represented as partially broken away in order to expose to view one of the lens elements 33. The lens barrel 24 is also provided with a ring-like, forwardly extending, flange formation 34 laterally extending from a flat, annular portion 34a, and to which flange formation 34 are attached the parts to which my invention is more particularly directed.

The lens flange formation 34 is provided with a suitable number of dowel screws, one of which is indicated at 35 in Fig. 1, and which are suitably spaced about the circumferential extent of said flange formation 34. The said dowel screws 35 are engaged by bayonet-type openings of equal number, one of which is indicated at 36 in Fig. 1, and two of which are indicated in Fig. 2, they being provided in the cylindrical flange of the rear unit or plate 37 of the filter mount with which my present invention is particularly concerned. The said rear unit or plate 37 constituting one main part of the filter support means is most clearly shown in Fig. 4, and is there represented as having provided thereon three spring members or fingers 38 attached thereto by rivets 38a, the purpose of such spring members or fingers being more fully set forth hereinafter. The said rear unit or plate 37 is also provided with three keyhole-type openings, as indicated at 39, and through which extend an equal number of clamping members 40 of rod-like or spindle shape, each of which, as best shown in Figs. 10 and 11, being provided with a through pin 41 for engaging a depression 42 positioned at right angles to the respective keyhole opening 39. Each clamping rod-like member 40 is provided with a head or knurled knob 40a and a coiled spring 43. When the knob 40a is pressed in an inward direction and is turned until the pin 41 is in alignment with the slot 39, the clamping rod-like member 40 having such knob 40a can be disengaged from the rear unit or plate 37, and when engaged as shown in Figs. 1, 2, 6, 10 and 11, a forward filter holder member or plate 44 (best shown in Fig. 5 and constituting the other main part of the filter support means) is held securely in place by means of the said several springs 43. The said rear unit or plate 37 is provided, in the disclosed embodiment of the invention, with three, spaced, inwardly extending, lug-like formations, one of which is indicated at 45 in Fig. 10, and all of which are formed integral with and extend from a wall 46 constituting a cylinder-like, laterally, inwardly extending formation of the rear unit or plate 37, as best shown in Figs. 4, 6, 8 and 10.

The purpose of the several lug-like formations 45 is to act as a support for a heater unit indicated generally at 47 and most clearly shown in Fig. 7 as made up of a ring of suitable insulating and heat resistant material having integral therewith a smaller ring formation 48 provided with a suitable series of spaced notches 49, best shown in Figs. 7 and 9.

In a suitable hole extending through the heater unit 47 is attached a metal eyelet 50, shown in Fig. 6 and indicated in Fig. 7, and anchored to said eyelet 50 is a heater wire 51 that extends from the eyelet 50 to the first notch 49, as best indicated in Fig. 7, and is supported on a ledge 52 of the ring 47, as most clearly shown in Fig. 8. The said heater wire 51 then extends across the front of the ring 47 in an upward direction viewing Figs. 6 and 7 to the second notch 49, then along the ledge 52 to the third notch 49, then downward viewing Figs. 6 and 7 across the front of the ring 47 to the fourth notch 49, and so on until the said heater wire 51 reaches the upper right hand notch 49 of the said ring 47, viewing said figures. The said heater wire 51 is then passed along the ledge 52 and is attached to a second metal eyelet 53, shown in Fig. 6 as positioned in a hole of the ring 47. The said heater wire 51 is then threaded through a groove 54 behind the ledge 52 and is brought back to a third metal eyelet 55 set in a suitable hole in the ring 47 and the heater wire 51 is securely attached thereto. Also attached to the third eyelet 55 is a conductor 56 and attached to the first eyelet 50 is a conductor 57. The two conductors 56 and 57 make up a heater supply cable 58 that leads to and so as to be in circuit with a battery or other current supply (not shown), and that is provided preferably in the camera or elsewhere in the airplane. In order to hold the supply cable 58 and the conductors 56 and 57 in place, a clamping member 59 (best shown in Figs. 1 and 7) is provided which is attached to the ring 47 by rivets 60, 60. The heater unit in and of itself is not of my invention per se, and is illustrated as an embodiment of a heater unit suitable for the purpose. It is one of many types of heater units available in the market. As herein disclosed, I have provided novel means for supporting the heater unit in place, and preferably in cooperative association with the filter holder or mount herein disclosed.

The back face of the ring 47 is provided with three suitably formed notches, one of which is indicated at 61 in Figs. 6 and 10, which are respectively engaged by the inwardly extending members 45 of the rear filter support unit or plate 37.

The heater unit 47 is placed in the filter holder or mount in a manner best shown in Fig. 1, and is properly positioned and held in correct spacing relation by the said inwardly extending members 45. Between the heater unit 47 and the lens flange 34, there is placed a suitable washer or gasket 62 in order to confine the heated air between the lens element 33 and a filter element 63, which is of any suitable construction, such as the Wratten filter or solid glass filter well known in the art.

It will be noted that the heater wire 51 of the heater unit 47 lies in close proximity to the rear face of the filter 63, and the front face of the latter is engaged by a suitable flange 64 of the front filter holder member 44. Inasmuch as the said filter holder member 44 is caused to be forced into contact with the filter 63 by means of the coiled springs 43, the filter will thereby be held in close contact with the heater unit 47, and said heater unit will be held in close contact with the inwardly extending members 45 and the gasket 62. The heater unit 47 is properly positioned in a radial direction by means of the spring fingers or members 38 (Figs. 4 and 8) which serve also to hold the heater unit 47 in position even though the front filter holder member 44 and the filter element 63 are removed for changing filters or for cleaning the same or for any other purpose. Inasmuch as the heater unit 47 is not in direct contact with the rear unit or plate 37 of the filter mount, except through the several lug-like formations 45, as shown in Fig. 10, there will be very little heat conduction from the heater unit 47 through the filter mount. Therefore my invention provides a more economical heating of the filter 63 and the lens element 33.

In order to retain the filter mount with respect to the lens flange 34, 34a, I have provided a suitable locking means, best known in Fig. 3. To the said lens flange 34, 34a, there is attached a fillister head screw 65 engaged by a latch 66 pivoted on a pin 67 passing through brackets 68, 69 that are held to the inner filter holder unit or plate 37 by rivets 70, 70, all as shown in Fig. 3. The filter holder member or plate 44 is provided with a suitable hole 71, shown in Fig. 5, through which the latch 66 passes when the front filter member or plate 44 is attached to the rear filter unit or plate 37, and attached to the latter is a dowel 72 to align properly the rear filter unit or plate 37, and the front filter holder member or plate 44 when said parts are assembled as shown in Fig. 1, through the engagement of notch 73 of the front filter holder member or plate 44. In order to cause the latch member 66 to turn in a contraclockwise direction to engage the screw 65, there is provided a spring 74 held to the rear filter holder unit or plate 37 by rivets 75, 75, as shown in Figs. 1 and 6.

In order to provide a passage way for the cable 58, there are provided cut-out openings 76 and 77 in the unit or plate 37 and the member or plate 44 respectively, as shown in Figs. 4 and 5. When the said ring-like parts 37 and 44 are assembled, these cut-outs form a hole 78 through which the cable 58 passes, as best shown in Figs. 6 and 9.

It will be evident from the foregoing that I have provided the lens barrel of the camera at its forward end with a broad, flat, annular rim extending radially outward from the lens barrel to present a substantially flat, broad, supporting surface for a heater unit and having a forwardly extending, annular formation at the radially outward portion of said broad annular rim.

The structure herein described provides a combination heater and filter mount or holder for aerial photographic cameras that is the result of a great deal of research and experimental work. I desire to point out that in a mount of this general type, it is desirable to have the heater as close as possible to the front element of the objective lens and in contact with the filter, or with a protecting glass, if a filter be not used.

I have found it to be very desirable to exclude all outside air from the area or zone that is between the objective lens and the filter, so as to provide more efficient heating. I have also found it to be very desirable to close up the space between the inner face of the wall of the sun shade 22 and the filter in order to prevent blasts of air from blowing past the filter mount to the lens barrel. It is also necessary in mounts of this general type (namely, a mount carrying both a filter and a heater) to have flexible couplings or clamping means to hold the filter and the heater in place, inasmuch as there is a great deal of contraction and expansion during a normal flight. In the structure herein disclosed I, have provided the desired flexible coupling that serves efficiently regardless of whatever temperature changes occur, and no undue strain is applied to the filter or to the heater in any use thereof.

My invention provides very simple means for changing from one filter to another, which it is frequently necessary to do. This is accomplished in the construction herein disclosed merely by removing the front member or plate 44 after having disengaged the pins 41 by manipulation of the knobs 40a. The heater unit will be held in place by the spring members or fingers 38 while such change is being made, as is clearly evident from Fig. 8. If a heater unit is found to be defective, it is a simple matter to remove it and replace it by a new heater unit merely by removing the front member or plate 44 and the filter 63 and then lifting the heater unit 47 from the filter mount.

The filter holder or mount is adapted to be very quickly attached to and detached from the objective lens barrel 24, which is essential as the front element 33 of the said lens barrel 24 must be readily accessible for cleaning.

Having thus described one illustrative embodiment of the invention, it is to be understood that although specific terms are employed, they are used in a generic and descriptive sense and not for purposes of limitation, the scope of the invention being set forth in the following claims.

I claim:

1. A filter mount or holder particularly for aerial photographic cameras including, in combination, and for attachment to the objective lens barrel of the camera, filter support means constructed to be removably attached directly to and against the front face of said objective lens barrel, said filter support means consisting wholly of two ring-plate-like members in face to face relationship, at the rear face of the forward one of which two members the filter element may be received, and a heater unit supported directly by the innermost of said two plate-like members in close proximity and substantial parallelism to the inner face of the filter element when the latter is in its position against the rear face of the forward one of said plate-like members, and means engaging both of said members and spaced circumferentially about the same, for holding said two members removably together with the filter and the heater unit between them, the said innermost member having a protruding formation shaped to be applied directly to and to be removably attached to the front face of the said lens barrel.

2. A filter mount or holder particularly for aerial photographic cameras including, in combination, and for attachment to the objective lens barrel of the camera, filter support means constructed to be removably attached to said objective lens barrel, said filter support means including two ring plate-like members, at the rear face of the forward one of which the filter element may be received, and a heater unit supported directly by the innermost of said two ring plate-like members in close proximity to the inner face of the filter element when in position, the said innermost ring plate-like member for that purpose having an annular inwardly-extending portion received by said lens barrel, said annular portion having a series of lug-like supporting formations extending inwardly therefrom to engage and support said heater unit.

3. A filter mount or holder particularly for aerial photographic cameras including, in combination, and for attachment to the objective lens barrel of the camera, filter support means constructed to be removably attached to said objective lens barrel, said filter support means including two ring plate-like members, at the rear face of the forward one of which the filter element may be received, and a heater unit supported directly by the innermost of said two ring plate-like members in close proximity to the inner face of the filter element when in position, said innermost ring plate-like member having a circumferentially arranged series of spaced spring members 38 to hold the heater unit in proper position radially within and spaced from said innermost ring plate like member.

4. A filter mount or holder particularly for aerial photographic cameras including, in combination, and for attachment to the objective lens barrel of the camera, filter support means constructed to be removably attached to said objective lens barrel, said filter support means including two ring plate-like members, at the rear face of the forward one of which the filter element may be received, and a heater unit supported directly by the innermost of said two plate-like members in close proximity to the inner face of the filter element when in position, the said innermost ring plate-like member being provided with circumferentially spaced, inwardly extending, struck-up formations 45 to receive and hold said heater unit.

5. A filter mount or holder particularly for aerial photographic cameras including, in combination and for readily removable attachment to the objective lens barrel of the camera, filter support means including two ring-shaped plate-like members 37, 44 in face to face relation to each other and between and by which both a filter and a heater unit are supported in close proximity to each other, one of said members having a series of circumferentially spaced openings and the other member having a corresponding series of axially turnable rod-like parts to be inserted in said openings and provided with cross formations to be entered through said openings and acting to hold said members together when said rod-like parts are turned, and springs positioned to co-act with said rod-like parts, to maintain said two plate-like members in yieldingly supported relation with respect to each other, with the filter and the heater unit between them.

6. A filter mount or holder in accordance with claim 5, but in which the springs co-acting with said rod-like parts are coiled springs respectively surrounding said rod-like parts and pressing against the adjacent face of the plate-like member carrying said rod-like parts.

7. A filter mount or holder particularly for aerial photographic cameras including, in combination and for readily removable attachment to the objective cylindrical lens-barrel of the camera, and in combination with said lens barrel, which latter has at the forward end of its cylindrical portion, a broad, flat, annular rim extending radially outward from said cylindrical barrel to present a substantially flat, broad supporting surface for a heater unit and having a forwardly extending annular formation at the radially outward portion of said broad annular rim; filter and heater support means including two ring-shaped plate-like members 37, 44 in face to face relation to each other in a position normal to the axis of the said lens barrel, and between and by which members both a filter and a ring-like heater unit with electrical circuit connections are supported in close proximity to each other, said member 37 having an inwardly-extending, annular formation 46 at its radially innermost part so as to be received upon said forwardly projecting annular formation of the lens barrel of the camera, with means for holding said two annular formations of the lens barrel and said member 37 removably together with the heater unit held by the cooperating action of said members 37 and 44 radially inside of said annular formations, with the filter supported by said members 37 and 44 in close proximity to said heater unit, the said member 37 for such purpose having means to engage and support said heater unit, and said member 44 having formations to engage and to support the filter unit in close parallel relationship to the heater unit.

8. A filter mount or holder in accordance with claim 7, but in which said heater unit is held by the said holding means therefor radially spaced from said annular formation 46 of said member 27.

9. A filter mount or holder in accordance with claim 7, but in which sealing means is provided between the inner face of said heater unit and the adjacent broad, flat, annular rim of the lens barrel of the camera to confine the heated air between the lens element and the filter.

10. A filter mount or holder in accordance with claim 7, but wherein a cylindrical lens shade is attached to the front of the lens support mounting ring of the camera radially beyond and independent of the cylindrical lens barrel and outside of and independent of said filter mount or holder with its inner surface sufficiently close to the circumferences of said members 37 and 44 substantially to cut off air drafts from the lens barrel of the camera.

11. A filter mount or holder in accordance with claim 7, but wherein the construction is such that the two plate-like members 37 and 44 can be removed as a unit from the lens barrel of the camera by withdrawing said annular formation 46 from the said annular formation extending from said broad, annular rim of the lens barrel, while both the heater unit and the filter are supported by and between said two plate-like members as a part of such removable unit.

12. A filter mount or holder in accordance with claim 7, but wherein means including the locking lever 66 carried by one of said members radially beyond the heater and filter and engaging the other member in a locking relation is provided to lock together the said two plate-like members 37 and 44.

13. A filter mount or holder in accordance with claim 7, but in which the filter is so held by its said supporting means that it can be removed from its functioning position upon separation of said plate-like members 37, 44, without disturbing the heater unit held within the said annular formation of the lens barrel of the camera.

14. A filter mount or holder in accordance with claim 7, but in which the annular formation 46 is provided with a series of circumferentially spaced bayonet slot openings and the annular formation of the lens barrel is provided with a like series of dowel screw-like projections to engage said bayonet slot openings, to hold said two plate-like members 37, 44 and the heater unit and filter in functioning position.

15. A filter mount or holder in accordance with claim 7, but in which said member 37 has extending radially inward therefrom a series of circumferentially spaced spring fingers 38 to engage at the periphery thereof and thereby support the heater unit in its position out of contact with said member 37 excepting by said fingers.

16. A filter mount or holder in accordance with claim 7, but in which said member 37 has extending radially inward therefrom a series of circumferentially spaced spring fingers 38 to engage at the periphery thereof and thereby support the heater unit in its position out of contact with said member 37 excepting by said fingers, and in which the member 44 is provided with an inner annular flange 64 to surround the filter element and support it in close proximity to the heater unit.

17. A filter mount or holder in accordance with claim 7, but in which said member 37 has extending radially inward therefrom a series of circumferentially spaced spring fingers 38 to engage at the periphery thereof and thereby support the heater unit in its position out of contact with said member 37 excepting by said fingers, and in which the member 44 is provided with an inner annular flange 64 to surround the filter element and support it in close proximity to the heater unit, and in which a gasket 62 is provided at the inner face of the heater unit to constitute sealing means to confine the heated air between the forward lens element and the filter.

18. For ready, quick attachment to and detachment from the lens barrel of a photographic camera, which lens barrel has at the forward end of its cylindrical portion, a broad, flat, annular rim extending radially outward from said cylindrical barrel to present a substantially flat, broad, supporting surface for a heater unit and having a forwardly extending annular formation at the radially outward portion of said broad annular rim, and in combination therewith, the following filter-and-heater unit, viz.: two plates of ring-like form constituting inner and outer supporting members, said radially inner member having its inner edge portion at substantially right angles to its radially outer portion and extending backwardly therefrom, thereby providing an annular sleeve-like portion to telescope with the similar forwardly extending, annular formation at the forward end of the lens barrel; means including springs for holding together said two plates in readily disengageable, slightly yielding, face to face relation with each other in a position normal to the longitudinal axis of the lens barrel; and a filter element and a heater element both of general ring-like form, both positioned between and supported directly by said two plates, in close proximity to each other with said heater element close to said broad, flat, annular rim at the forward end of the lens barrel; the described construction thus permitting the ready application of the said filter-and-heater unit to the said lens barrel end, and its ready removal therefrom as a unit.

19. A structure in accordance with claim 18, but wherein the said inner member of ring-like form is provided with means for engaging peripherally and thereby holding the said heater element in position and permitting the removal of the said outer member of ring-like form and the filter element from said inner member for substitution of another filter element or other purpose, without necessitating the removal of said heater element from its relationship to said inner member in so doing.

20. A structure in accordance with claim 18, but wherein sealing means is provided between the inner face of the positioned heater element and the said radially extending broad, flat, annular rim at the forward end of the lens barrel to confine the heated air between the forward lens element and the filter element.

21. A structure in accordance with claim 18, but wherein the front of the lens support mounting ring of the camera is provided with a substantially cylindrical lens shade encircling and supported entirely independent of the outer end of the lens barrel and projecting forward beyond the same, and wherein the said filter-and-heater unit is of such size and diameter as to extend nearly to the inner surface of said lens shade, thereby substantially excluding air drafts from the said lens barrel.

22. In a photographic camera, a cylindrical lens barrel supported by the camera structure; said lens barrel having its forward end, wherein a lens element is mounted, provided with a radially-outwardly-extending, surrounding, broad rim presenting a continuous annular face lying in a plane normal to the longitudinal axis of said lens barrel, said broad rim at its radially outermost part being bent forwardly at substantially right angles and consequently extending forward as an annulus concentric with the axis of the lens barrel; a ring-shaped heater unit supported within said annulus so as to lie flatwise substantially against said broad rim inside said annulus radially beyond said lens barrel; a rear-unit filter mount plate having an annulus telescoped with the annulus of the lens barrel and removably secured thereto, said rear-unit filter mount plate having extending radially outward from its own annulus, at right angles thereto, a flat rim of ring shape, the face whereof lies in a plane normal to the axis of said lens barrel and radially beyond said broad rim extending from the lens barrel; a filter positioned outside of and in parallelism with said heater unit and said rear-unit filter mount plate; a forward filter holder plate presenting an annular face; and means to support said forward filter holder plate detachably with its said annular face in substantial parallelism with said face of the rim of said rear-unit filter mount plate with the filter held between said two plates close to said heater unit.

23. In a photographic camera, a cylindrical lens barrel supported by the camera structure; said lens barrel having its forward end, wherein a lens element is mounted, provided with a radially outwardly-extending, surrounding, broad rim presenting a continuous annular face lying in a plane normal to the longitudinal axis of said lens barrel, said broad rim at its radially outermost part being bent forwardly at substantially right angles and consequently extending forward as an annulus concentric with the axis of the lens barrel; a rear-unit filter mount plate having an annulus telescoped with the annulus of the lens barrel and removably secured thereto, said rear-unit filter mount plate having extending radially outward from its own annulus, at right angles thereto, a flat rim of ring shape, the face whereof lies in a plane normal to the axis of said lens barrel and radially beyond said broad rim extending from the lens barrel; a filter positioned outside of and in parallelism with said rear-unit filter mount plate; a forward filter holder plate presenting an annular face; and means to support said forward filter holder plate detachably with its said annular face in substantial parallelism with said face of the rim of said rear-unit filter mount plate with the filter held between said two plates.

24. A structure in accordance with claim 22, but wherein spring means are provided for yieldingly connecting together said rear-unit filter mount plate and said forward filter holder plate, thereby providing flexible coupling means to compensate for contraction and expansion due to temperature changes.

25. A structure in accordance with claim 23, but wherein spring means are provided distributed and spaced circumferentially about the said two plates for resiliently connecting them together with the filter in position against an inner surface of the said forward filter-holder plate.

26. A structure in accordance with claim 1, but wherein said means engaging both of said members are provided with springs pressing said two members resiliently together, to allow for contraction and expansion of parts because of temperature changes.

27. A structure in accordance with claim 1, but wherein said means engaging both of said members are provided with springs pressing said two members resiliently together, to allow for contraction and expansion of parts because of temperature changes, said means engaging both of said members being readily disengageable from one of said members, to permit said members to be separated so as to withdraw the filter.

28. A structure in accordance with claim 1, but wherein the means for directly supporting the heater unit by the innermost of said two plate-like members consists of small extensions from the substance of said innermost member and engaging the periphery of the heater unit and thereby holding the latter out of other contact with said innermost member.

29. A structure in accordance with claim 1, but wherein the means engaging both of said members extends through both of said members and have interengaging formations releasably to engage the innermost of said members so as to permit the separation of said two members from each other for the removal of the filter element or the heater unit from between them.

30. A structure in accordance with claim 1, but wherein the means engaging both of said members extends through both of said members and have interengaging formations releasably to engage the innermost of said members so as to permit the separation of said two members from each other for the removal of the filter element or the heater unit from between them, said means engaging both of said members having springs serving to force said two members toward each other, to hold the filter and the heater unit resiliently in position.

REYNOLD J. NITSCH.